(12) United States Patent
Hsieh

(10) Patent No.: US 7,467,526 B2
(45) Date of Patent: Dec. 23, 2008

(54) DESALINATING PROCESS

(76) Inventor: Hsuan-Chi Hsieh, 4Fl., No. 27, Lane 160, Hsin Sheng S. Rd., Sec. 1, Taipei (TW)

( * ) Notice: Subject to any disclaimer, the term of this patent is extended or adjusted under 35 U.S.C. 154(b) by 330 days.

(21) Appl. No.: 11/050,843

(22) Filed: Feb. 7, 2005

(65) Prior Publication Data

US 2006/0175235 A1    Aug. 10, 2006

(51) Int. Cl.
  *B01D 9/04* (2006.01)
  *C02F 1/22* (2006.01)
(52) U.S. Cl. .................................... 62/532; 62/543
(58) Field of Classification Search ............ 62/532, 62/543
  See application file for complete search history.

(56) References Cited

U.S. PATENT DOCUMENTS

| | | | | |
|---|---|---|---|---|
| 2,424,663 A | * | 7/1947 | Mantle | 426/384 |
| 2,921,444 A | * | 1/1960 | Weniger et al. | 62/543 |
| 3,314,881 A | * | 4/1967 | Tuwiner | 62/534 |
| 3,509,730 A | * | 5/1970 | Harrison | 62/123 |
| 3,830,075 A | * | 8/1974 | Cheng et al. | 62/536 |
| 4,356,015 A | * | 10/1982 | Oliver | 62/543 |
| 4,668,345 A | * | 5/1987 | Warren | 202/182 |

* cited by examiner

*Primary Examiner*—William C Doerrler
(74) *Attorney, Agent, or Firm*—Troxell Law Office, PLLC

(57) ABSTRACT

A desalinating process is disclosed. The process comprises freezing sea water as ice of sea water, exerting an external force on the ice of sea water to separate salt therefrom for converting the ice of sea water into ice of fresh water, storing the salt and the ice of fresh water in two different places, and melting the ice of fresh water to produce drinkable fresh water.

3 Claims, 2 Drawing Sheets

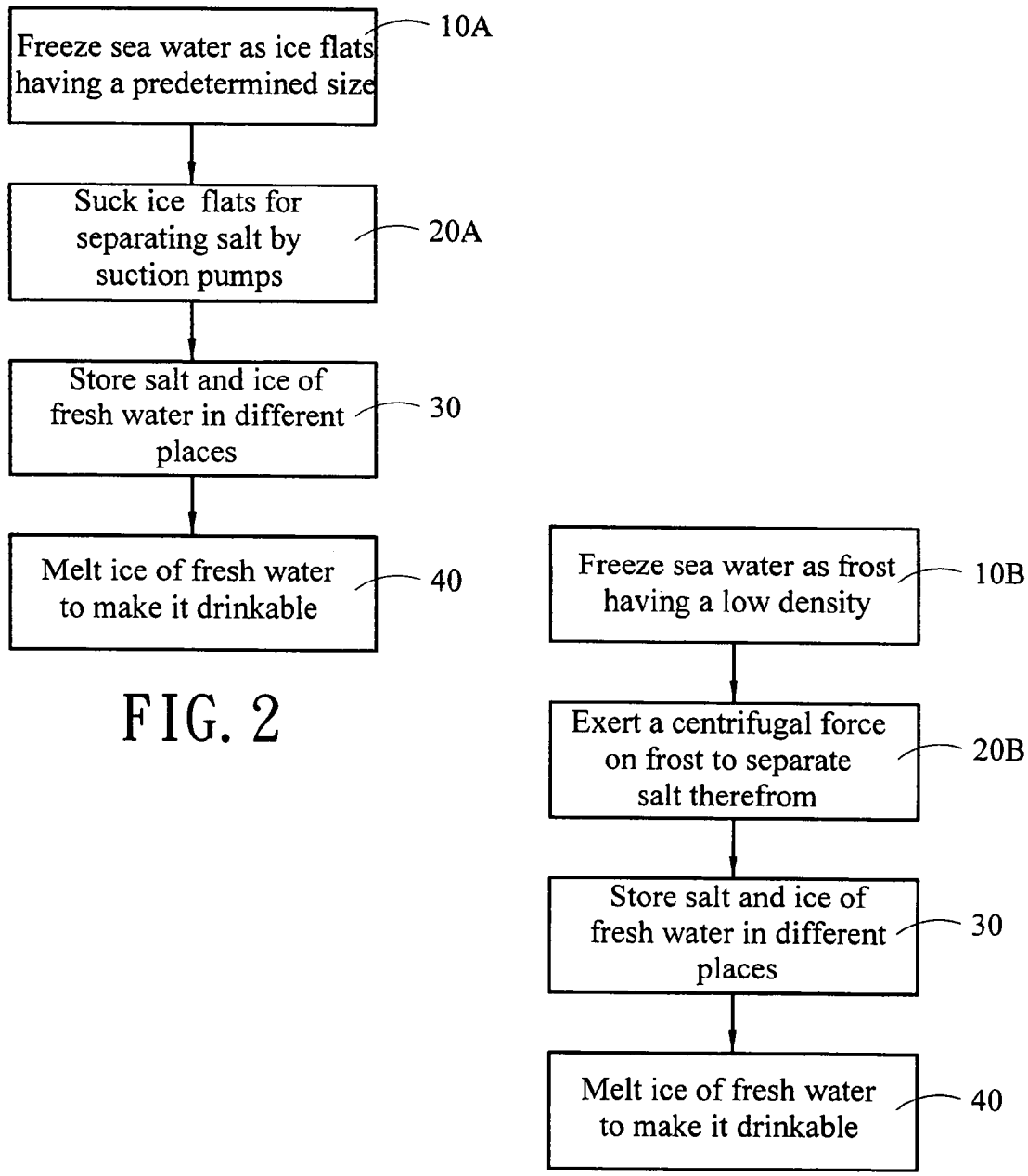

DESALINATING PROCESS

BACKGROUND OF THE INVENTION

1. Field of the Invention

The present invention relates to desalination and more particularly to an improved desalinating process.

2. Description of Related Art

It is estimated that there are about 1.4×1,018 tons of water on earth in which about 97.5% is salty sea water and the remaining about 2.5% is fresh water. As to fresh water, about 98% thereof exists on North and South Poles and the Iceland. It is known that water is gradually becoming a rare source in recent years due to population increase, pollution in rivers and lakes, excessive logging of rain forests, environmental disasters, green house effect, etc. As such, desalination has become an important issue. Conventionally, desalination is done by either heating sea water by means of solar energy or distilling sea water by means of boilers. For the former technique, it can save energy. But its production is low. For the latter technique, it can produce fresh water in a large scale. But it also can consume much energy. Moreover, maintenance of boilers is labor intensive. In brief, the cost of prior desalination is very high, thus limiting the applications of desalination.

It is known that a volume of ice is about 1.09 times of that of water (i.e., an increase of volume about 1.09 times). As known that water can be expressed as H2O in a chemical form in which two atoms of hydrogen (H) are combined with one atom of oxygen (O), i.e., there is a hydrogen bond in water molecule. Also, atoms H—O—H are arranged in a substantially straight line. A large gap is thus formed between two water molecules due to the above arrangement. To the contrary, a close packing is done if there is no hydrogen bond in water molecule. For example, about 50% of water molecules are formed by hydrogen bonds in room temperature while about 100% of ice molecules are formed by hydrogen bonds. In other words, the higher percentage of the hydrogen bonds in water molecules means the larger of gap between two water molecules. This means that gaps in ice are larger than that in water. In this regard, ice is larger than water in volume in a case that ice and water have the same weight.

It is known that an ice bar (e.g., Popsicle) is formed of sugar and water. Sugar is first sucked into the mouth while eating an ice bar. As such, ice in the ice bar will become tasteless in subsequent suctions. This is because sugar molecule in the form of solid and ice (i.e., a solid form of water) are combined together in a form of compound. As a result, a structural strength of the sugar and ice compound is very weak. Moreover, sugar molecules exist in gaps of ice molecules because, as stated above, the gaps in ice are larger than that in water. In addition, sugar and ice have different specific weights. That is why sugar along with a small amount of water is first sucked into the mouth while eating an ice bar. Hence, ice in the ice bar will become tasteless in subsequent suctions.

Likewise, the main ingredient of sea water is salt. Sea water is salty because salt is dissolved in water. A frozen temperature of sea water is from about −20° C. to about −15° C. Ice has a smaller density when sea water is frozen because salt is dissolved in water. That is, ice formed by sea water has a loose structure. In other words, ice is similar to a compressed snow ball. Hence, salt and a small amount of water will be easily separated from ice cubes of sea water when a centrifugal force is exerted on the ice cubes of sea water or a sucking is done on the ice cubes of sea water. The present invention is made possible as the present inventor takes advantage of the above principles.

SUMMARY OF THE INVENTION

It is an object of the present invention to provide a desalinating process comprising freezing sea water and separating salt from ice cubes of sea water by applying an external force thereon. The process has the advantages of less manufacturing steps, quickness, higher fresh water production percentage, practicability, and cost effectiveness.

It is another object of the present invention to provide a desalinating process which is applicable to either large-scale desalination or homes.

The above and other objects, features and advantages of the present invention will become apparent from the following detailed description taken with the accompanying drawings.

BRIEF DESCRIPTION OF THE DRAWINGS

FIG. 2 is a flowchart of a second preferred embodiment of desalinating process according to the invention; and FIG. 3 is a flowchart of a third preferred embodiment of desalinating process according to the invention.

DETAILED DESCRIPTION OF THE PREFERRED EMBODIMENTS

Figure 1:
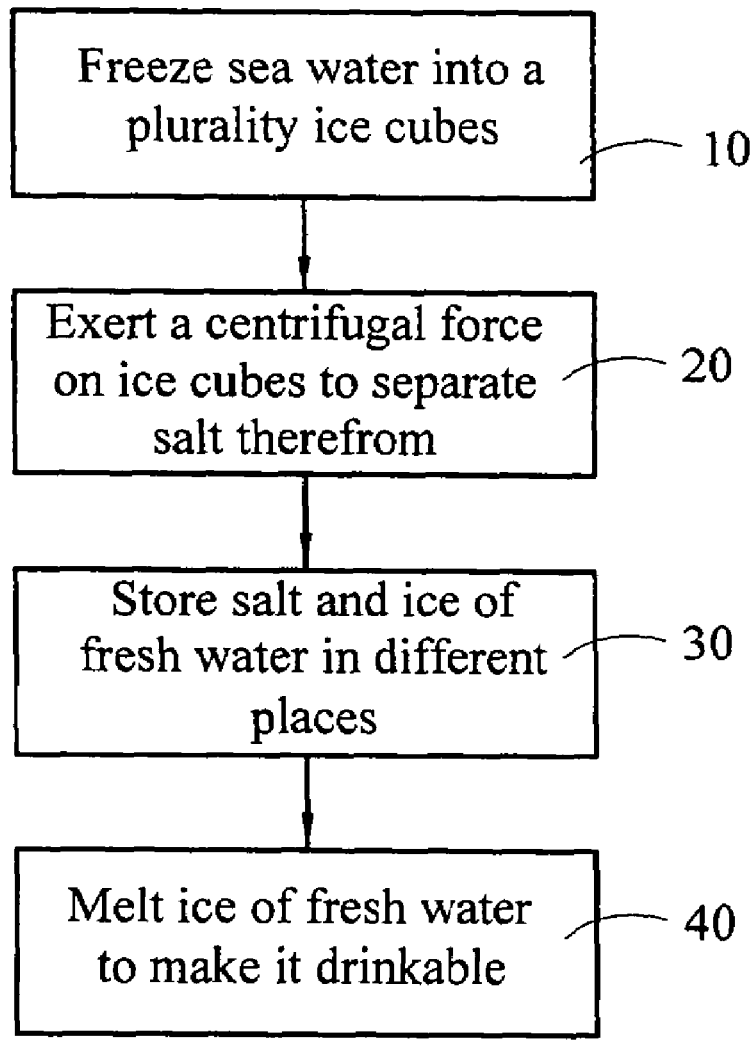
FIG. 1 is a flowchart of a first preferred embodiment of desalinating process according to the invention.

Referring to FIG. 1, there is shown a desalinating process in accordance with a first preferred embodiment of the invention. The process of FIG. 1 begins in step 10, freeze sea water by a vacuum refrigerating method in which the purified sea water is frozen as ice cubes of sea water. In step 20, exert a centrifugal force on the ice cubes of sea water to separate salt therefrom because salt molecules and water molecules are formed as ice cubes of sea water having a loose structure and salt has a larger specific weight as compared with that of water. In brief, the characteristic of the invention is that salt molecules can be easily separated from ice cubes of sea water by applying an external force thereon. In step 30, store salt and ice cubes of fresh water in different places in which ice cubes of fresh water is formed by removing salt from ice cubes of sea water. In step 40, melt ice cubes of fresh water to produce drinkable fresh water and store the separated salt for future industrial use.

Referring to FIG. 2, there is shown a desalinating process in accordance with a second preferred embodiment of the invention. The steps 30, and 40 of the second preferred embodiment are the same as that of the first preferred embodiment. Thus a detailed description thereof is omitted herein for the sake of brevity. The differences between the first and the second preferred embodiments, i.e., the characteristics of the second preferred embodiment are detailed at steps 10A and 20A below. In step 10A, freeze sea water as a plurality of ice flats of sea water having a predetermined size by a vacuum refrigerating method. In step 20A, suck the ice flats for separating salt by means of suction pumps. In detail, the ice flats are arranged upright and are continuously transported by a conveyor (not shown). Suction pumps are arranged along sides of the conveyor. The suction pumps are activated to suck salt from surfaces of the ice flats in the transporting process. The efficiency of salt separation in the second preferred embodiment is greatly improved since sea water is frozen as the plurality of ice flats of sea water and the larger surfaces of the ice flats are sucked by the suction pumps.

Referring to FIG. 3, there is shown a desalinating process in accordance with a third preferred embodiment of the invention. The steps 30, and 40 of the third preferred embodiment are the same as that of the first preferred embodiment. Thus a detailed description thereof is omitted herein for the sake of brevity. The differences between the first and the third preferred embodiments, i.e., the characteristics of the third preferred embodiment are detailed at steps 10B and 20B below. In step 10B, freeze sea water as frost of sea water having a low density by a vacuum refrigerating method. The frost comprises a plurality of ice particles having a size and density smaller than that of the ice cubes in the first preferred embodiment. In step 20B, exert a small centrifugal force on the frost of sea water to separate salt therefrom. In the third preferred embodiment a rotating drum employed in the salt separation is required to have smaller meshes for facilitating the separation of salt from small frost of fresh water.

It will be evident from the foregoing that the invention is made possible by utilizing the facts that percentage of the hydrogen bonds is increased as water is frozen as ice, gaps between any two adjacent ice molecules are larger, and a separation of salt from the gaps is made easier. As such, salt can be easily separated from ice cubes of sea water when an external force (e.g., centrifugal force or suction pumping force) is exerted thereon. As a result, less time is required for freezing sea water than freezing fresh water and it is easier to separate salt from sea water of low density. Thus, the process of the invention has the advantages energy saving, less manufacturing steps, quickness, higher fresh water production percentage, and cost effectiveness.

While the invention herein disclosed has been described by means of specific embodiments, numerous modifications and variations could be made thereto by those skilled in the art without departing from the scope and spirit of the invention set forth in the claims.

What is claimed is:

1. A desalinating process, comprising the steps of:
(1) freezing an amount of purified sea water into an amount of ice of sea water;
(2) exerting an external force on the amount of ice of sea water to separate an amount of salt therefrom for converting the amount of ice of sea water into an amount of ice of fresh water;
(3) storing the amount of separated salt and the amount of ice of fresh water in two different reservoirs; and
(4) melting the amount of ice of fresh water to produce a drinkable fresh water;
wherein the amount of ice of sea water in the step (1) is formed into a plurality of ice flats of sea water; and
wherein the external force in the step (2) is a pumping suction force applied on the plurality of ice flats of sea water.

2. A desalinating process, comprising the steps of:
(1) freezing an amount of purified sea water into an amount of ice of sea water;
(2) exerting an external force on the amount of ice of sea water to separate an amount of salt therefrom for converting the amount of ice of sea water into an amount of ice of fresh water;
(3) storing the amount of separated salt and the amount of ice of fresh water in two different reservoirs; and
(4) melting the amount of ice of fresh water to produce a drinkable fresh water;
wherein the amount of ice of sea water in the step (1) is formed into a plurality of ice cubes of sea water; and
wherein the external force in the step (2) is a pumping suction force applied on the plurality of ice cubes of sea water.

3. A desalinating process, comprising the steps of:
(1) freezing an amount of purified sea water as an amount of frost of sea water having a low density;
(2) exerting an external force on the amount of frost of sea water to separate an amount of salt therefrom for converting the amount of frost of sea water into an amount of ice of fresh water;
(3) storing the amount of separated salt and the amount of ice of fresh water in two different reservoirs; and
(4) melting the amount of ice of fresh water to produce a drinkable fresh water;
wherein the external force in the step (2) is a pumping suction force.

* * * * *